US009204218B2

(12) United States Patent
Matsumoto

(10) Patent No.: US 9,204,218 B2
(45) Date of Patent: Dec. 1, 2015

(54) MICROPHONE SENSITIVITY DIFFERENCE CORRECTION DEVICE, METHOD, AND NOISE SUPPRESSION DEVICE

(71) Applicant: FUJITSU LIMITED, Kawasaki-shi, Kanagawa (JP)

(72) Inventor: Chikako Matsumoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 207 days.

(21) Appl. No.: 14/155,731

(22) Filed: Jan. 15, 2014

(65) Prior Publication Data

US 2014/0241546 A1 Aug. 28, 2014

(30) Foreign Application Priority Data

Feb. 28, 2013 (JP) ................................ 2013-039695

(51) Int. Cl.
*H04B 15/00* (2006.01)
*H04R 3/04* (2006.01)
*H04R 29/00* (2006.01)

(52) U.S. Cl.
CPC ................ *H04R 3/04* (2013.01); *H04R 29/006* (2013.01)

(58) Field of Classification Search
CPC ................................ H04R 3/04; H04R 29/006
USPC ............................................ 381/86, 92, 94.1
See application file for complete search history.

(56) References Cited

U.S. PATENT DOCUMENTS

2002/0034310 A1* 3/2002 Hou ....................... H04R 3/005 381/92
2003/0097257 A1 5/2003 Amada et al.
2008/0152154 A1* 6/2008 Daishin ..................... H04S 3/00 381/26
2009/0052696 A1* 2/2009 Iwamatsu .............. H04R 3/007 381/111
2010/0232620 A1 9/2010 Matsuo

FOREIGN PATENT DOCUMENTS

JP H07-131886 A 5/1995
JP 2003-223198 A 8/2003
WO WO 2009/069184 A1 6/2009

* cited by examiner

*Primary Examiner* — Paul S Kim
*Assistant Examiner* — Katherine Faley
(74) *Attorney, Agent, or Firm* — Fujitsu Patent Center

(57) ABSTRACT

A microphone sensitivity difference correction device includes a detection section that detects a frequency domain signal expressing a stationary noise, based on frequency domain signals of input sound signals respectively input from plural microphones; a first correction section that employs the stationary noise to compute a first correction coefficient for correcting the sensitivity difference between the plural microphones by a frame unit; and a second correction section that employs the frequency domain signals that have been corrected by the first correction section to compute a second correction coefficient for correcting by frequency unit the sensitivity difference between the plural microphones for each of the frames.

20 Claims, 11 Drawing Sheets

MICROPHONE SENSITIVITY DIFFERENCE CORRECTION DEVICE, METHOD, AND NOISE SUPPRESSION DEVICE

CROSS-REFERENCE TO RELATED APPLICATION

This application is based upon and claims the benefit of priority of the prior Japanese Patent Application No. 2013-039695, filed on Feb. 28, 2013, the entire contents of which are incorporated herein by reference.

FIELD

The embodiments discussed herein are related to a microphone sensitivity difference correction device, a microphone sensitivity difference correction method, a microphone sensitivity difference correction program and a noise suppression device.

BACKGROUND

In, for example, a vehicle mounted car navigation system, a hands-free phone, or a telephone conference system, noise suppression is conventionally performed to suppress noise contained in a speech signal that has mixed-in noise other than a target voice (for example voices of people talking). Technology employing a microphone array including plural microphones is known as such noise suppression technology.

In such conventional noise suppression technology using a microphone array, there is a method for noise suppression based on an amplitude ratio between signals received from plural microphones. The amplitude ratio becomes 1.0 when the distance between each of the microphones and the sound source is the same distance or when far away, and the amplitude ratio is a value that deviates from 1.0 when the distance between each of the microphones and the sound source is a different distance. Noise suppression based on the amplitude ratio is a method that employs the amplitude ratio, and so, for example, when a target sound source is present at a position that has different distances to each of the microphones, the method suppresses noise that has a value of amplitude ratio of close to 1.0 in the received signals from the plural microphones.

However, even when the distances between each of the microphones and the sound sources are the same distances, sometimes the value of the amplitude ratio deviates from 1.0 due to sensitivity differences that arise between each of the microphones. Since accurate noise suppression based on amplitude ratio is not be performed in such cases, there is accordingly a need for technology to correct for such sensitivity differences between the microphones.

As technology to correct sensitivity differences between microphones, there is, for example, a proposal for a device that corrects the level from at least one sound signal by deriving a correction coefficient when performing audio processing based on sound signals respectively generated from sound input to plural sound input sections. In such a device, for respective sounds input to the plural sound input sections, frequency components are detected of sound arriving from a substantially orthogonal direction with respect to a straight line defining the placement position of a first sound input section and a second sound input section among the plural sound input sections. The direction from which the sound arrives is detected based on phase differences between the sounds arriving from the first sound input section and the second sound input section. In order to match the levels of sound signal respectively generated by the first sound input section and the second sound input section based on the sound of the detected frequency components, correction coefficients are derived for correcting the level of at least one of the respective sound signals generated from the input sound by the first sound input section and the second sound input section.

RELATED PATENT DOCUMENTS

International Publication Pamphlet No. WO2009/069184

However, in conventional technology to correct for sensitivity differences between microphones, a direction of arriving sound is detected based on phase difference of sound respectively arriving at two input sections. Thus when each of the microphones are placed in positions that enable the phase difference to be used across all frequency regions, correction of sensitivity difference is possible in a range over which there is not such a large sensitivity difference between the microphones. However, when the separation between two microphones is wider than the speed of sound/sampling frequency, due to sampling processing, sometimes phase rotation of phase differences occurs in high frequency bands. In such cases, the direction of arriving sound is no longer accurately detectable based on phase difference, and this hence makes it impossible to perform sensitivity difference correction over all frequency bands.

Moreover, when the separation between two microphones is narrower than the speed of sound/sampling frequency, the following issue arises even in cases in which it is possible to detect the direction of the arriving sound based on the phase difference over all the frequency bands. There are limited conditions to make a sound source be present in a direction in which the amplitude of the signals received from each of the microphones are the same as each other, so as to detect sound arriving from orthogonal directions in conventional technology. The probability of detecting sound that matches these conditions is accordingly low, and time is required until the correction coefficient is updated to enable appropriate sensitivity difference correction to be performed, and sometimes sensitivity difference correction is performed based on correction coefficients that are not appropriate to the actual sensitivity difference. In particular when the sensitivity difference is large, this leads to audio distortion when sensitivity difference correction immediately after sound emission is not performed in time.

SUMMARY

According to an aspect of the embodiments, a microphone sensitivity difference correction device includes: a detection section that detects a frequency domain signal expressing a stationary noise, based on frequency domain signals of input sound signals respectively input from plural microphones contained in a microphone array that have been converted into signals in a frequency domain for each frame; a first correction section that employs the frequency domain signal expressing the stationary noise to compute a first correction coefficient for correcting the sensitivity difference between the plural microphones by a frame unit, and that employs the first correction coefficient to correct the frequency domain signals by frame unit; and a second correction section that employs the frequency domain signals that have been corrected by the first correction section to compute a second correction coefficient for correcting by frequency unit the sensitivity difference between the plural microphones for each of the frames, and that employs the second correction coefficient to correct for each of the frames by frequency unit the frequency domain signals that have been corrected by the first correction section.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Detailed explanation follows regarding an example of an exemplary embodiment of technology disclosed herein, with reference to the drawings.

First Exemplary Embodiment

Figure 1:
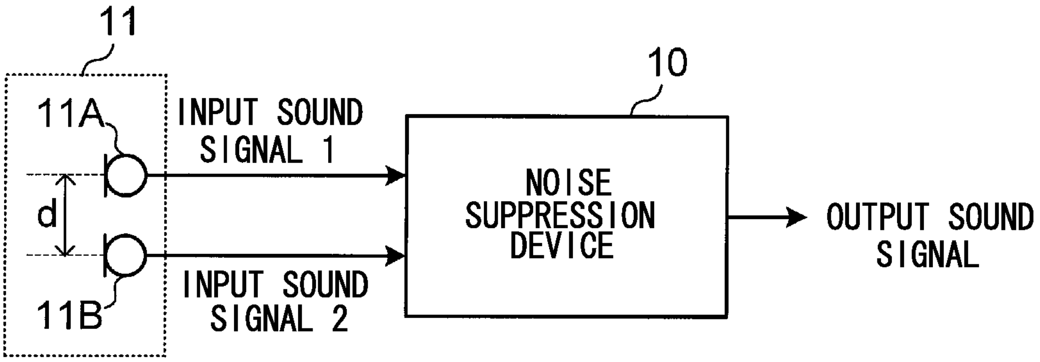
FIG. 1 is a block diagram illustrating an example of a configuration of a noise suppression device according to a first exemplary embodiment.

FIG. 1 illustrates a noise suppression device 10 according to a first exemplary embodiment. A microphone array 11 of plural microphones at a specific separation d is connected to the noise suppression device 10. There are at least two microphones included in the microphone array 11. Explanation follows regarding an example in which two microphones are included, microphone 11A and microphone 11B.

The microphones 11A and 11B collect peripheral sound and convert the collected sound into an analogue signal and output the signal. The signal output from the microphone 11A is input sound signal 1 and the signal output from the microphone 11B is input sound signal 2. Noise other than the target voice (sound from the target voice source, for example voices of people talking) is mixed into the input sound signal 1 and the input sound signal 2. The input sound signal 1 and the input sound signal 2 that have been output from the microphone array 11 are input to the noise suppression device 10. In the noise suppression device 10, after correcting for sensitivity difference between the microphone 11A and the microphone 11B, a noise suppressed output sound signal is generated and output.

Figure 2:
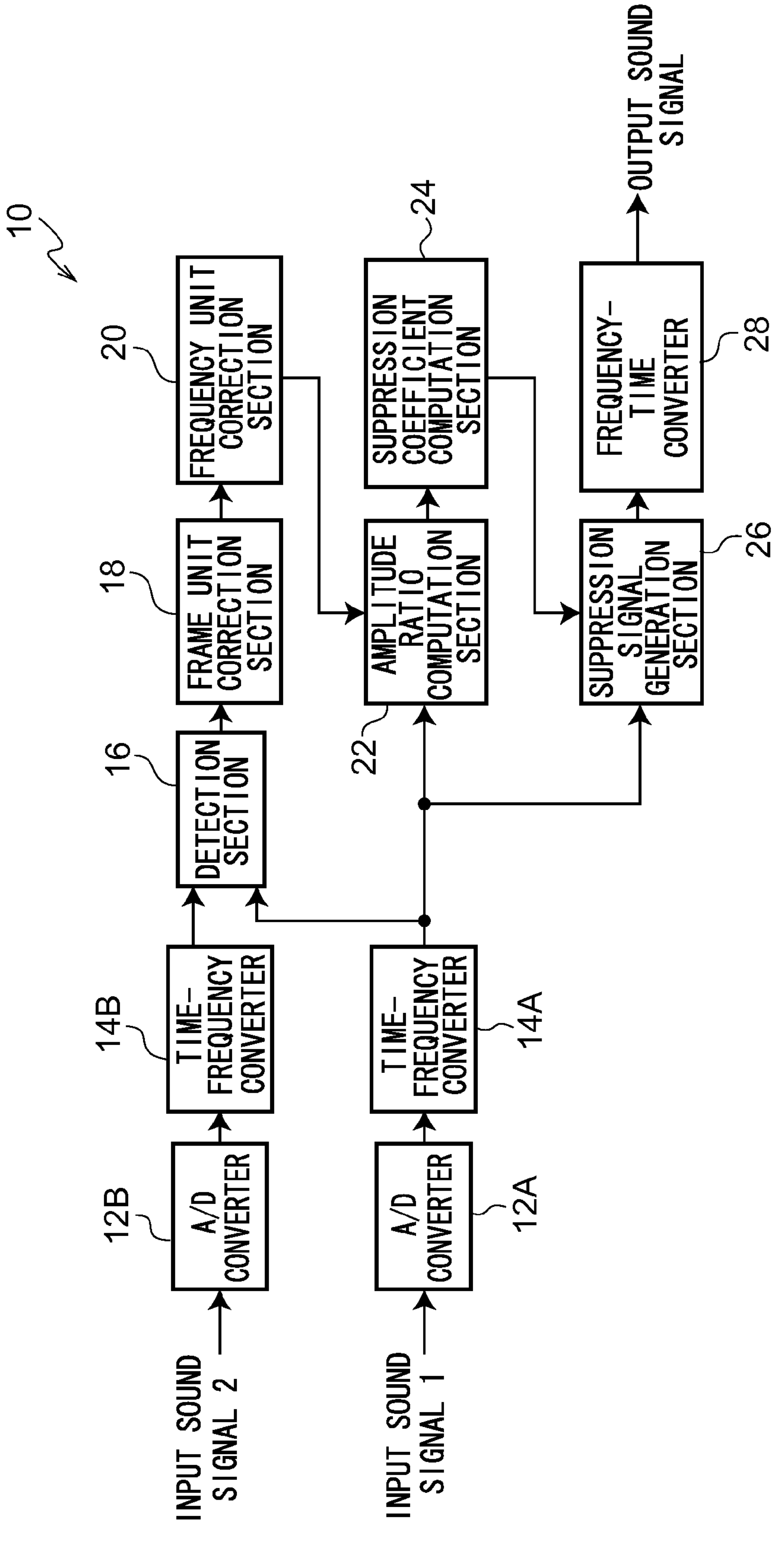
FIG. 2 is a block diagram illustrating an example of a functional configuration of a noise suppression device according to the first exemplary embodiment.

As illustrated in FIG. 2, the noise suppression device 10 includes analogue-to-digital (A/D) converters 12A, 12B, time-frequency converters 14A, 14B, a detection section 16, a frame unit correction section 18, a frequency unit correction section 20, and an amplitude ratio computation section 22. The noise suppression device 10 also includes a suppression coefficient computation section 24, suppression signal generation section 26, and a frequency-time converter 28. Note that the frame unit correction section 18 is an example of a first correction section of technology disclosed herein. The frequency unit correction section 20 is an example of a second correction section of technology disclosed herein. The amplitude ratio computation section 22, the suppression coefficient computation section 24, and the suppression signal generation section 26 are examples of a suppression section of technology disclosed herein. Portions of the A/D converters 12A, 12B, the time-frequency converters 14A, 14B, the detection section 16, the frame unit correction section 18, the frequency unit correction section 20 and the frequency-time converter 28 are examples of a microphone sensitivity difference correction device of technology disclosed herein.

The A/D converters 12A, 12B respectively take the input sound signal 1 and the input sound signal 2 that are input analogue signals and convert them at a sampling frequency Fs into a signal $M_1(t)$ and a signal $M_2(t)$ that are digital signals. t is a sampling time stamp.

The time-frequency converters 14A, 14B respectively take the signal $M_1(t)$ and the signal $M_2(t)$ that are time domain signals converted by the A/D converters 12A, 12B, and convert them into signals $M_1(f, i)$ and signals $M_2(f, i)$ that are frequency domain signals for each of the frames. Fast Fourier Transformation (FFT) may for example be employed for conversion from the time domain signals to the frequency domain signals. Note that i denotes frame number and f denotes frequency. Namely, M(f, i) is a signal representing the frequency f of frame i, and is an example of a frequency domain signal of technology disclosed herein. Moreover, 1 frame may be set at for example several tens of msec.

The detection section 16 employs the signals $M_1(f, i)$ and the signals $M_2(f, i)$ converted by the time-frequency converters 14A, 14B to determine whether or not there is stationary noise for each of the frequencies f in each of the frames, or whether or not there is a nonstationary sound containing a voice. Signals $M_1(f, i)$ and signals $M_2(f, i)$ expressing stationary noise is detected thereby.

Determination as to whether or not a sound is stationary noise or a nonstationary sound may utilize a method described for example "Japanese Laid-open Patent Publication No. 2011-186384". More specifically, a stationary noise model $N_{st}(f, i)$ is estimated based on the signals $M_2(f, i)$ and the signals $M_2(f, i)$, and a ratio r(f, i) is derived between a stationary noise model $N_{st}(f, i)$ and signals $M_1(f, i)$. The ratio r(f, i) is expressed as $r(f, i)=M_1(f, i)/N_{st}(f, i)$. From the fact that sound containing a nonstationary sound generally has a large r(f, i), and a stationary noise has an r(f, i) value close to 1.0, signals $M_1(f, i)$ and the signals $M_2(f, i)$ are determined to be signals representing a stationary noise when the value of the r(f, i) is near to 1.0. Note that determination may be made as to whether or not a sound is stationary noise based on the ratio r(f, i) between the stationary noise model $N_{st}(f, i)$ and the signals $M_2(f, i)$.

As another method for determining whether or not a sound is stationary noise or a nonstationary sound, determination may be made as to whether or not the spectral profile of the signals $M_1(f, i)$ has a peak and trough structure with the characteristics of voice data. Determination may be made that there is stationary noise when there is a poorly defined peak and trough structure. Determination of the peak and trough structure may be performed by comparison of peak values of the signal. Note that determination may be made as to whether or not there is stationary noise based on the spectral profile of the signals $M_2(f, i)$.

Moreover, as another method for determining whether or not a sound is stationary noise or nonstationary sound, there is a method in which a correlation coefficient is computed between a spectral profile of signals $M_1(f, i)$ of the current frame and spectral profiles of signals $M_1(f, i)$ of the previous frame. When the correlation coefficient is near to 0, then determination may be made that the signals $M_1(f, i)$ and the signals $M_2(f, i)$ are signals representing stationary noise. Note that stationary noise detection may be made based on the correlation between the spectral profile of the signals $M_2(f, i)$ of the current frame and the spectral profile of the signals $M_2(f, i)$ of the previous frame.

The frame unit correction section 18 employs the signals $M_1(f, i)$ and the signals $M_2(f, i)$ detected by the detection section 16 as signals representing stationary noise and computes a sensitivity difference correction coefficient at frame unit level, and corrects the signals $M_2(f, i)$ at the frame unit level. For example, a sensitivity difference correction coefficient $C_1(i)$ may be computed at the frame unit level as expressed by the following Equation (1). Note that the sensitivity difference correction coefficient $C_1(i)$ at the frame unit level is an example of a first correction coefficient of technology disclosed herein.

$$C_1(i) = \alpha \times C_1(i-1) + (1-\alpha) \times \left( \sum_{j=0}^{f_{max}} |M_i(f, i)| \Big/ \sum_{f=0}^{f_{max}} |M_2(f, i)| \right) \tag{1}$$

Wherein: $\alpha$ is an update coefficient expressing the extent to reflect the frame unit sensitivity difference correction coefficient $C_1(i-1)$ computed for the previous frame in the frame unit sensitivity difference correction coefficient $C_1(i)$ of the current frame, and is a value such that $0 \le \alpha < 1$. Note that $\alpha$ is an example of a first update coefficient of technology disclosed herein. Namely, the sensitivity difference correction coefficient $C_1(i-1)$ of the previous frame is updated by computing the sensitivity difference correction coefficient $C_1(i)$ of the current frame. Moreover, $f_{max}$ is a value that is ½ the sampling frequency Fs. The term $\Sigma|M_1(f, i)|$ of Equation (1) takes a value that is the sum of the signals $M_1(f, i)$ detected as signals expressing stationary noise by the detection section 16 over the range from frequency 0 to $f_{max}$. Similar applies to $\Sigma|M_2(f, i)|$.

Moreover, the frame unit correction section 18 generates signals $M_2'(f, i)$ that are the signals $M_2(f, i)$ corrected as expressed by following Equation (2) based on the computed sensitivity difference correction coefficient $C_1(i)$ by frame unit.

$$M_2'(f, i) = C_1(i) \times M_2(f, i) \tag{2}$$

The frame unit sensitivity difference correction coefficient $C_1(i)$ expresses the sensitivity difference at the frame unit level between the signals $M_1(f, i)$ and the signals $M_2(f, i)$. Multiplying the frame unit sensitivity difference correction coefficient $C_1(i)$ by the signals $M_2(f, i)$ enables the sensitivity difference between the signals $M_1(f, i)$ and signals $M_2(f, i)$ to be corrected at the frame unit level.

The frequency unit correction section 20 employs the signals $M_1(f, i)$ and the signals $M_2'(f, i)$ corrected at the frame unit level by the frame unit correction section 18 to compute a sensitivity difference correction coefficient at the frequency unit level, and to correct the signals $M_2'(f, i)$ by frequency unit. For example, a frequency unit sensitivity difference correction coefficient $C_P(f, i)$ may be computed as expressed in following Equation (3). Note that the frequency unit sensitivity difference correction coefficient $C_P(f, i)$ is an example of a second correction coefficient of technology disclosed herein.

$$C_P(f, i) = \beta \times C_P(f, i-1) + (1-\beta) \times (|M_1(f, i)| / |M_2'(f, i)|) \tag{3}$$

Wherein: $\beta$ is an update coefficient representing the extent to reflect the frequency unit sensitivity difference correction coefficient $C_P(f, i-1)$ computed at the same frequency f for the previous frame in the frequency unit sensitivity difference correction coefficient $C_P(f, i)$ of the current frame, and is a value such that $0 \le \beta < 1$. Note that $\beta$ is an example of a second update coefficient of technology disclosed herein. Namely, the frequency unit sensitivity difference correction coefficient $C_P(f, i-1)$ of the previous frame is updated by computing the frequency unit sensitivity difference correction coefficient $C_P(f, i)$ of the current frame.

Moreover, the frequency unit correction section 20 generates signals $M_2''(f, i)$ of the signals $M_2'(f, i)$ corrected as expressed by the following Equation (4) based on the computed frequency unit sensitivity difference correction coefficient $C_P(f, i)$.

$$M_2''(f, i) = C_P(f, i) \times M_2'(f, i) \tag{4}$$

The frequency unit sensitivity difference correction coefficient $C_P(f, i)$ expresses the sensitivity difference at the frequency unit level between the $M_1(f, i)$ and the $M_2'(f, i)$. Multiplying the frequency unit sensitivity difference correction coefficient $C_P(f, i)$ by the $M_2'(f, i)$ enables correction to be performed by frequency unit of the sensitivity difference between the signals $M_1(f, i)$ and the signals $M_2'(f, i)$. Note that the signals $M_2'(f, i)$ are signals on which correction has already been performed at the frame unit level, and correction at the frequency unit level is correction that performs fine correction for each of the frequencies.

The amplitude ratio computation section 22 computes the respective amplitude spectra each of the signals $M_1(f, i)$ and signals $M_2''(f, i)$. Amplitude ratios $R(f, i)$ are then respectively computed between amplitude spectra of the same frequency for each of the frequencies in each of the frames.

Figure 3:
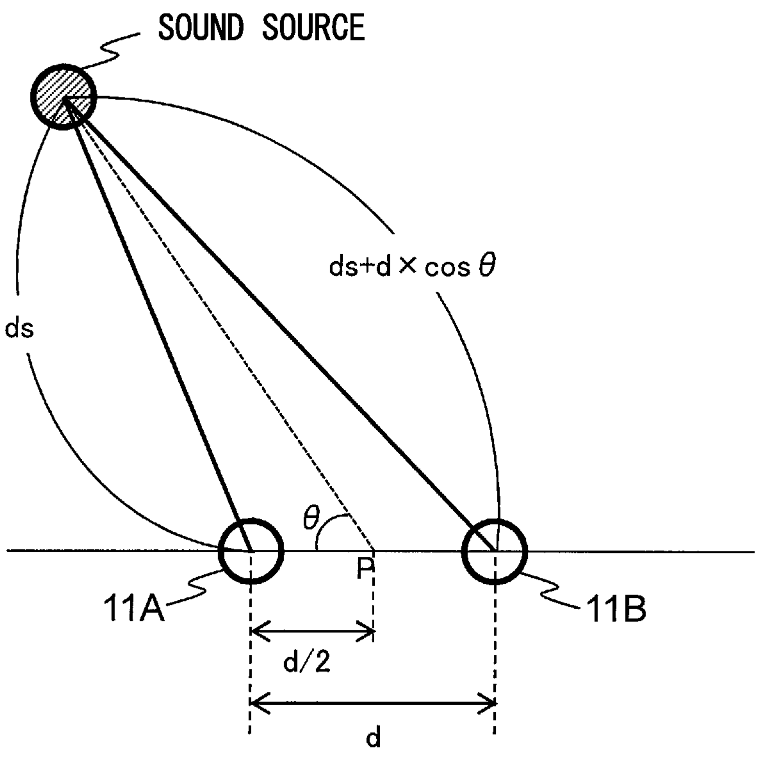
FIG. 3 is a schematic diagram to explain a sound source position with respect to a microphone array.

Based on the amplitude ratios $R(f, i)$ computed by the amplitude ratio computation section 22, the suppression coefficient computation section 24 then determines whether or not the input sound signal is a target voice or noise and computes a suppression coefficient. A case is now considered in which, as illustrated in FIG. 3, a separation between the microphone 11A and the microphone 11B (inter-microphone distance) is d, a sound source direction is $\theta$, and a distance from the sound source to the microphone 11A is ds. Note that sound direction $\theta$ is a direction in which a sound source is present with respect to the microphone array 11, and as illustrated in FIG. 3, is expressed by an angle formed between a straight line passing through the centers of two microphones and a line segment that has one end at a central point P at the center of the two microphones and the other end at the sound source. In such a case a theoretical value $R_T$ of the amplitude ratio between the input sound signal 1 and the input sound signal 2 (the amplitude ratio when there is no sensitivity difference occurring between the microphones) is expressed by the following Equation (5).

$$R_T = \{ds/(ds + d \times \cos\theta)\} \quad (0 \le \theta \le 180) \tag{5}$$

When the sound source direction of the target voice desired to be left without suppression is from $\theta_{min}$ to $\theta_{max}$, then a theoretical value $R_T$ of the amplitude ratio is a value from $R_{min}$ to $R_{max}$ as expressed by the following Equation (6) and Equation (7).

$$R_{min}=ds/(ds+d\times\cos\theta_{min}) \quad (6)$$

$$R_{max}=ds/(ds+d\times\cos\theta_{max}) \quad (7)$$

The suppression coefficient computation section 24 accordingly first determines a range $R_{min}$ to $R_{max}$ based on the inter-microphone distance d, the sound source direction θ, and the distance ds from the sound source of the target voice to the microphone 11A. Then when the computed amplitude ratios R(f, i) are within the range $R_{min}$ to $R_{max}$, the input sound signal is determined to be the target voice, and a suppression coefficient ε(f, i) is computed as set out below.

$$\epsilon(f,i)=1.0$$

when $R_{min}\le R(f,i)\le R_{max}$ $$\epsilon(f,i)=\epsilon_{min}$$

when $R(f,i)<R_{min}$ or $R(f,i)>R_{max}$

Note that $\epsilon_{min}$ is a value such that $0<\epsilon_{min}<1$, and when for example a suppression amount of −3 dB is desired $\epsilon_{min}$ is about 0.7, and when a suppression amount of −6 dB is desired $\epsilon_{min}$ is about 0.5. Moreover, when the computed amplitude ratio R(f, i) ε falls outside of the range $R_{min}$ to $R_{max}$, then suppression coefficient ε may be computed so as to gradually change from 1.0 to $\epsilon_{min}$ as the amplitude ratio R(f, i) progresses away from the range $R_{min}$ to $R_{max}$ as expressed by the following.

$$\epsilon(f,i)=1.0$$

when $R_{min}\le R(f,i)\le R_{max}$ $$\epsilon(f,i)=10(1.0-\epsilon_{min})R(f,i)-10R_{min}(1.0-\epsilon_{min})+1.0$$

when $R_{min}-0.1\le R(f,i)\le R_{min}$ $$\epsilon(f,i)=-10(1.0-\epsilon_{min})R(f,i)+10R_{max}(1.0-\epsilon_{min})+1.0$$

when $R_{max}\le R(f,i)\le R_{max}+0.1$ $$\epsilon(f,i)=\epsilon_{min}$$

when $R(f,i)<R_{min}-0.1$, or $R(f,i)>R_{max}+0.1$

The suppression coefficient ε(f, i) described above is a value from 0.0 to 1.0 that becomes nearer to 0.0 the greater to degree of suppression.

By multiplying the suppression coefficient ε(f, i) computed by the suppression coefficient computation section 24 by the signals $M_1(f, i)$, the suppression signal generation section 26 generates a suppression signal in which noise has been suppressed for each of the frequencies and each frame.

The frequency-time converter 28 takes the suppression signal that is a frequency domain signal generated by the suppression signal generation section 26 and converts it into an output sound signal that is a time domain signal by using for example an inverse Fourier transform, and outputs the converted signal.

Figure 4:
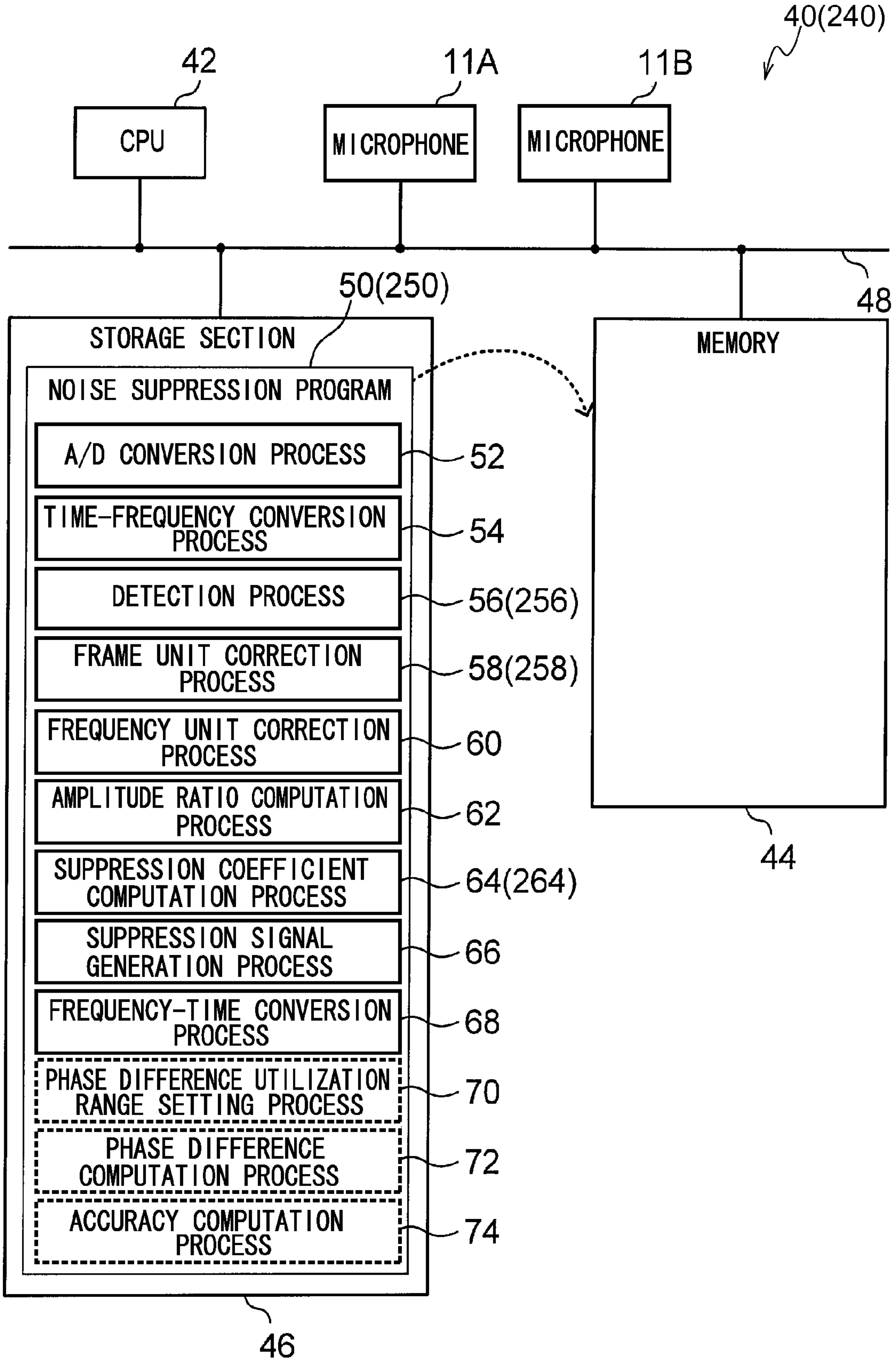
FIG. 4 is a schematic block diagram illustrating an example of a computer that functions as a noise suppression device.

The noise suppression device 10 may, for example, be implemented by a computer 40 such as that illustrated in FIG. 4. The computer 40 includes a CPU 42, a memory 44 and a nonvolatile storage section 46. The CPU 42, the memory 44 and the storage section 46 are connected together through a bus 48. The microphone array 11 (the microphones 11A and 11B) are connected to the computer 40.

The storage section 46 may be implemented for example by a Hard Disk Drive (HDD) or a flash memory. The storage section 46 serving as a storage medium is stored with a noise suppression program 50 for making the computer 40 function as the noise suppression device 10. The CPU 42 reads the noise suppression program 50 from the storage section 46, expands the noise suppression program 50 in the memory 44 and sequentially executes the processes of the noise suppression program 50.

The noise suppression program 50 includes an A/D conversion process 52, time-frequency conversion process 54, a detection process 56, a frame unit correction process 58, a frequency unit correction process 60, and an amplitude ratio computation process 62. The noise suppression program 50 also includes a suppression coefficient computation process 64, a suppression signal generation process 66, and a frequency-time conversion process 68.

The CPU 42 operates as the A/D converters 12A, 12B illustrated in FIG. 2 by executing the A/D conversion process 52. The CPU 42 operates as the time-frequency converters 14A, 14B illustrated in FIG. 2 by executing the time-frequency conversion process 54. The CPU 42 operates as the detection section 16 illustrated in FIG. 2 by executing the detection process 56. The CPU 42 operates as the frame unit correction section 18 illustrated in FIG. 2 by executing the frame unit correction process 58. The CPU 42 operates as the frequency unit correction section 20 illustrated in FIG. 2 by executing the frequency unit correction process 60. The CPU 42 operates as the amplitude ratio computation section 22 illustrated in FIG. 2 by executing the amplitude ratio computation process 62. The CPU 42 operates as the suppression coefficient computation section 24 illustrated in FIG. 2 by executing the suppression coefficient computation process 64. The CPU 42 operates as the suppression signal generation section 26 illustrated in FIG. 2 by executing the suppression signal generation process 66. The CPU 42 operates as the frequency-time converter 28 illustrated in FIG. 2 by executing the frequency-time conversion process 68. The computer 40 executing the noise suppression program 50 accordingly functions as the noise suppression device 10.

Note that it is possible to implement the noise suppression device 10 with, for example, a semiconductor integrated circuit, and more particularly with an Application Specific Integrated Circuit (ASIC) and Digital Signal Processor (DSP).

Explanation next follows regarding operation of the noise suppression device 10 according to the first exemplary embodiment. When the input sound signal 1 and the input sound signal 2 are output from the microphone array 11, the CPU 42 expands the noise suppression program 50 stored on the storage section 46 into the memory 44, and executes the noise suppression processing illustrated in FIG. 5.

Figure 5:
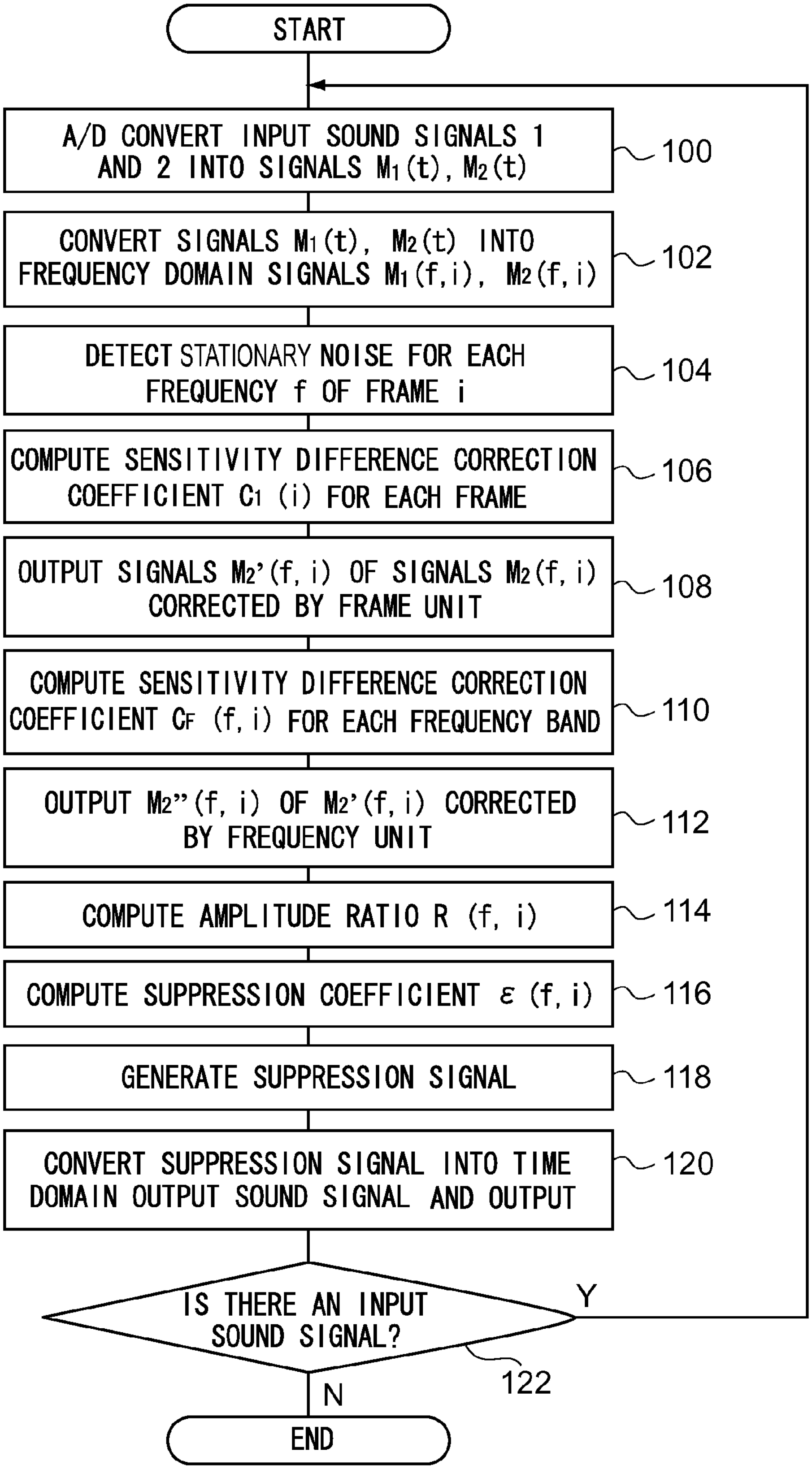
FIG. 5 is a flow chart illustrating noise suppression processing according to the first exemplary embodiment.

At step 100 of the noise suppression processing illustrated in FIG. 5, the A/D converters 12A, 12B respectively convert, with the sampling frequency Fs, the input sound signal 1 and the input sound signal 2 that are input analogue signals into the signal $M_1(t)$ and the signal $M_2(t)$ that are digital signals.

At the next step 102, the time-frequency converters 14A, 14B respectively convert the signal $M_1(t)$ and the signal $M_2(t)$ that are time domain signals into the signals $M_1(f, i)$ and the signals $M_2(f, i)$ that are frequency domain signals for each of the frames.

At the next step 104, the detection section 16 employs the signals $M_2(f, i)$ and the signals $M_2(f, i)$ to determine, for each of the frequencies f of the frame i, whether or not the input sound signal is a stationary noise or a nonstationary sound, and to detect signals $M_1(f, i)$ and the signals $M_2(f, i)$ expressing stationary noise.

At the next step 106, the frame unit correction section 18 employs the signals $M_1(f, i)$ and the signals $M_2(f, i)$ detected as signals expressing stationary noise to compute the frame unit sensitivity difference correction coefficient $C_1(i)$ such as for example expressed by Equation (1).

At the next step 108, the frame unit correction section 18 multiplies the frame unit sensitivity difference correction coefficient $C_1(i)$ by the signals $M_2(f, i)$, and generates signals $M_2'(f, i)$ with the sensitivity difference between the signals $M_1(f, i)$ and the signals $M_2(f, i)$ corrected by frame unit.

At the next step 110, the frequency unit correction section 20 employs the signals $M_1(f, i)$ and the signals $M_2'(f, i)$ to compute the sensitivity difference correction coefficient $C_P(f, i)$ at frequency unit level as for example expressed by Equation (3).

At the next step 112, the frequency unit correction section 20 multiplies the sensitivity difference correction coefficient $C_P(f, i)$ by frequency unit by the signals $M_2'(f, i)$, and generates the signals $M_2''(f, i)$ with the sensitivity difference between the signals $M_1(f, i)$ and the signals $M_2'(f, i)$ corrected by frequency unit.

At the next step 114, the amplitude ratio computation section 22 computes amplitude spectra for each of the signals $M_1(f, i)$ and signals $M_2''(f, i)$. The amplitude ratio computation section 22 then compares amplitude spectra against each other for the same frequency for each of the frequencies and each of the frames, and computes amplitude ratios $R(f, i)$.

At the next step 116, the suppression coefficient computation section 24 determines whether the input sound signal is the target voice or stationary noise based on the amplitude ratios $R(f, i)$, and computes the suppression coefficient $\epsilon(f, i)$.

At the next step 118, the suppression signal generation section 26 multiplies the suppression coefficient $\epsilon(f, i)$ by the signals $M_1(f, i)$ to generate suppression signals with suppressed noise for each of the frequencies of each of the frames.

At the next step 120, the frequency-time converter 28 converts the suppression signal that is a frequency domain signal into an output sound signal that is a time domain signal by employing for example an inverse Fourier transform.

At the next step 122, the A/D converters 12A, 12B determine whether or not there is a following input sound signal. When an input sound signal has been input, processing returns to step 100, and the processing of steps 100 to 120 is repeated. The noise suppression processing is ended when determined that no subsequent input sound signal has been input.

As explained above, according to the noise suppression device 10 of the first exemplary embodiment, the fact that the amplitude ratio between input sound signals is close to 1.0 for a stationary noise is employed to detect stationary noise in the input sound signals, and to correct for the sensitivity difference between the microphones. Utilizing the stationary noise enables a voice to be detected from a wider range by using sensitivity difference correction than in cases in which sensitivity difference correction is performed based on a voice arriving from a specific direction detected using phase difference. Moreover, in the sensitivity difference correction, correction is performed by frequency unit to signals in which at least one signal of the input sound signals converted into frequency domain signals has first been corrected by frame unit. Thereby sensitivity difference correction is enabled to be performed rapidly even in cases in which the sensitivity difference is different for each of the frequencies. Thus according to the noise suppression device 10 of the first exemplary embodiment, the time until a stable correction coefficient for sensitivity difference correction is achieved is shortened even in cases in which the sensitivity difference between microphones is large. Namely, rapid correction of inter-microphone sensitivity difference is enabled. A decrease is thereby enabled in audio distortion caused by noise suppression in which sensitivity difference correction is delayed.

Note that in the first exemplary embodiment, explanation has been given of a case in which signals $M_2(f, i)$ are corrected for sensitivity difference based on inter-microphone sensitivity differences, and a noise suppression coefficient is then multiplied by the signals $M_1(f, i)$ to generate a suppression signal. This envisages a case in which the target sound source is positioned close to the microphone 11A that collects sound of the input sound signal 1. When the target sound source is positioned close to the microphone 11B, signals $M_1(f, i)$ may be corrected for sensitivity difference, and a noise suppression coefficient then multiplied by the signals $M_2(f, i)$ to generate a suppression signal. Either of these methods may be employed when there is no large difference between the respective distances from the target sound source to the microphone 11A and the microphone 11B.

Moreover, although explanation has been given in the first exemplary embodiment of cases in which the frame unit sensitivity difference correction coefficient $C_1(i)$ and the frequency sensitivity difference correction coefficient $C_P(f, i)$ by frequency unit are updated for each of the frames, there is no limitation thereto. The above noise suppression processing may be executed for a fixed period of time T1 (for example T1=1 hour), and then the finally updated values of $C_1(i)$ and $C_P(f, i)$ saved in a memory, such that the saved values of $C_1(i)$ and $C_P(f, i)$ are subsequently employed. Moreover, configuration may be made such that the above noise suppression processing is executed every fixed period of time T2 (for example T2=1 hour), and the final updated values of $C_1(i)$ and $C_P(f, i)$ after executing the above noise suppression processing for a fixed period of time T3 (for example T3=10 minutes) utilized in the interval until the next fixed period of time T2.

Moreover, an update coefficient $\alpha$ in Equation (1) and an update coefficient $\beta$ in Equation (3) may be set so as to be larger the longer the execution duration of the above noise suppression processing. Note that updates of the update coefficients $\alpha$ and $\beta$ may both be performed using the same method, or may be performed using separate methods.

Second Exemplary Embodiment

Figure 6:
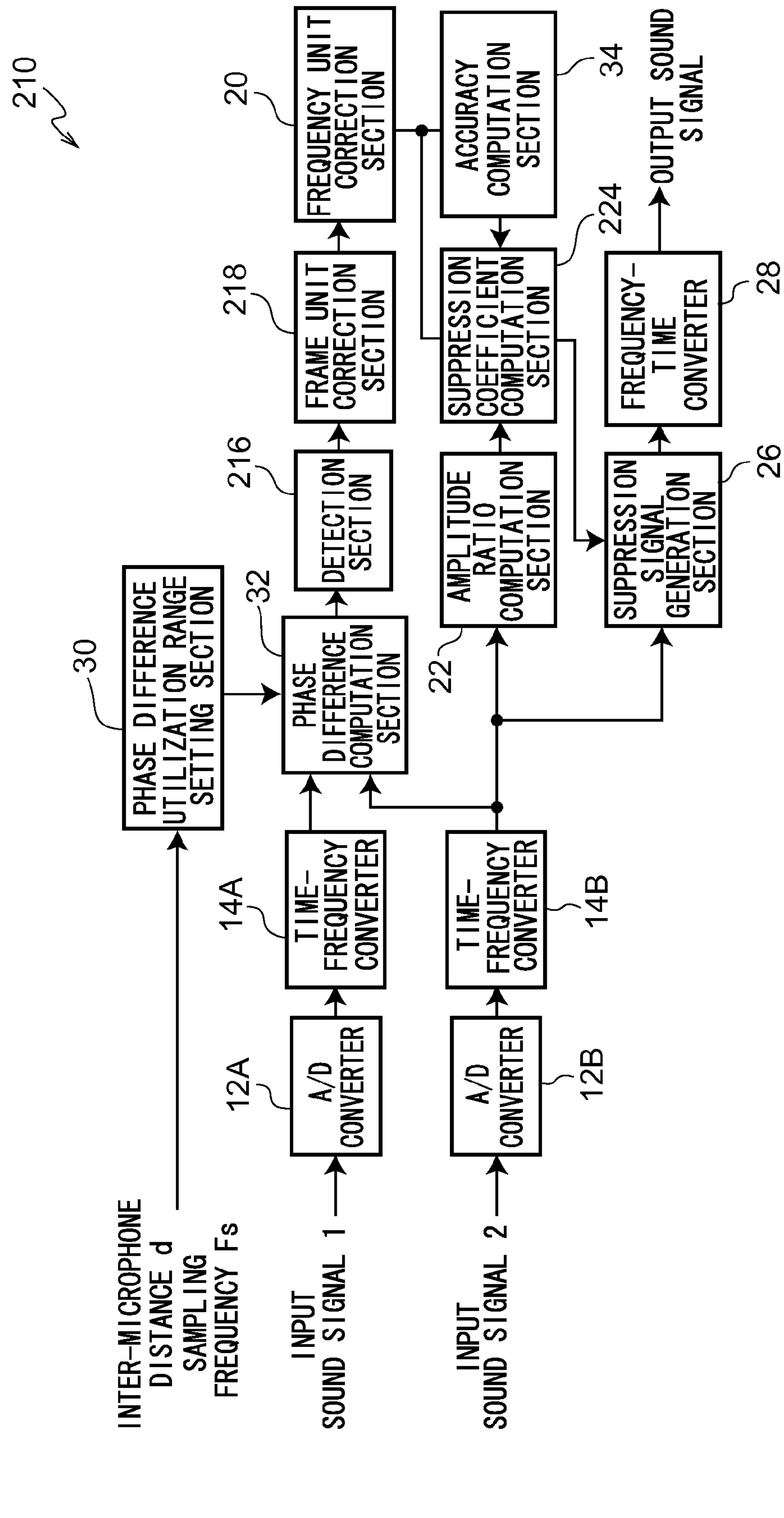
FIG. 6 is a block diagram illustrating an example of a functional configuration of a noise suppression device according to a second exemplary embodiment.

FIG. 6 illustrates a noise suppression device 210 according to a second exemplary embodiment. Note that the same reference numerals are allocated in the noise suppression device 210 to similar parts to those of the noise suppression device 10 of the first exemplary embodiment, and further explanation is omitted thereof.

As illustrated in FIG. 6, the noise suppression device 210 includes A/D converters 12A, 12B, time-frequency converters 14A, 14B, a detection section 216, a frame unit correction section 218, a frequency unit correction section 20, and an amplitude ratio computation section 22. The noise suppression device 210 also includes a suppression coefficient computation section 224, suppression signal generation section 26, a frequency-time converter 28, a phase difference utilization range setting section 30, a phase difference computation section 32 and an accuracy computation section 34. Note that the frame unit correction section 218 is an example of a first correction section of technology disclosed herein. The frequency unit correction section 20 is an example of a second correction section of technology disclosed herein. The amplitude ratio computation section 22, the suppression coefficient computation section 224, and the suppression signal generation section 26 are examples of a suppression section of technology disclosed herein. Portions of the A/D converters 12A, 12B, the time-frequency converters 14A, 14B, the detection section 216, the frame unit correction section 218, the frequency unit correction section 20 and the frequency-time converter 28 are examples of a microphone sensitivity difference correction device of technology disclosed herein.

The phase difference utilization range setting section 30 receives setting values for inter-microphone distance and sampling frequency, and sets a frequency band capable of utilizing phase difference to determine a sound arrival direction based on the inter-microphone distance and the sampling frequency.

Figure 7:
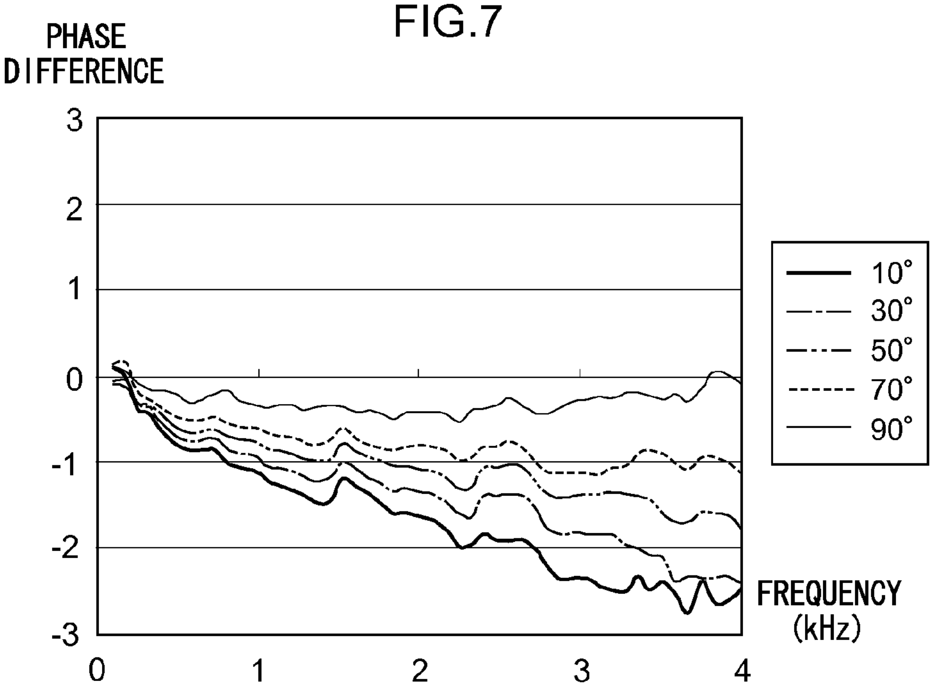
FIG. 7 is a graph illustrating an example of phase difference when an inter-microphone distance is short.
Figure 8:
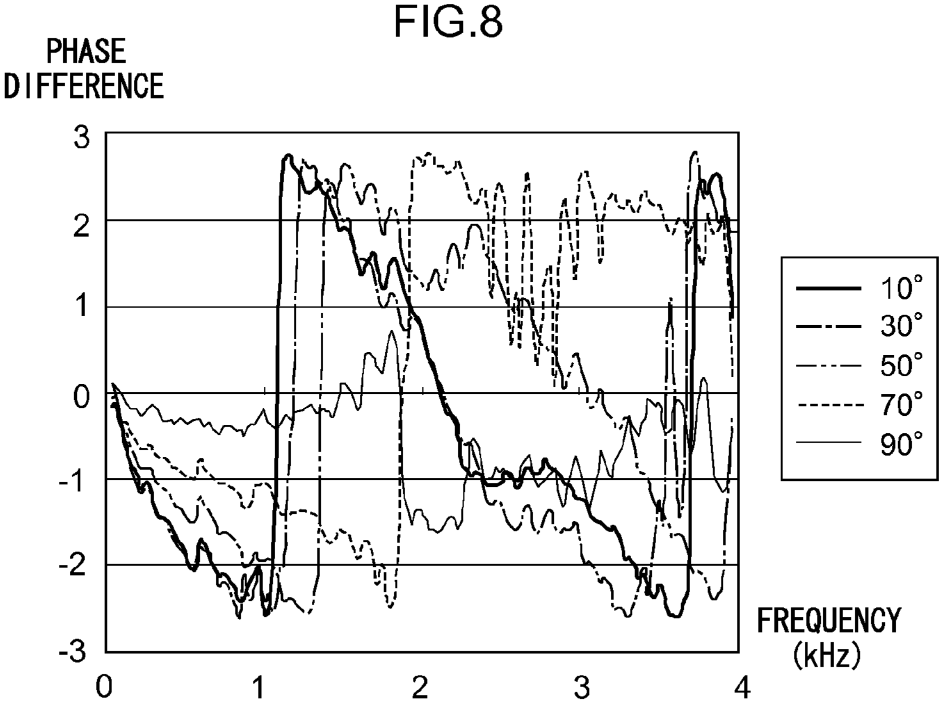
FIG. 8 is a graph illustrating an example of phase difference when an inter-microphone distance is long.

Explanation next follows regarding a relationship between inter-microphone distance and sampling frequency, and the phase difference between the input sound signal 1 and the input sound signal 2 (the difference in phase spectra for the same frequency). FIG. 7 is a graph illustrating the phase difference between the input sound signal 1 and the input sound signal 2 for each sound source direction when the inter-microphone distance d between the microphone 11A and the microphone 11B is smaller than speed of sound c/ sampling frequency Fs. FIG. 8 is a graph illustrating the phase difference between the input sound signal 1 and the input sound signal 2 for each sound source direction when the inter-microphone distance d is larger than speed of sound c/ sampling frequency Fs. Sound source directions of 10°, 30°, 50°, 70°, 90° are illustrated in FIG. 7 and FIG. 8.

As illustrated in FIG. 7, since phase rotation does not occur in any sound source direction when the inter-microphone distance d is smaller than speed of sound c/ sampling frequency Fs, there is no impediment to utilizing the phase difference to determine the arrival direction of the sound. However, as illustrated in FIG. 8, when the inter-microphone distance d is larger than speed of sound c/ sampling frequency Fs, phase rotation occurs in a high region frequency band higher than a given frequency (in the vicinity of 1 kHz in the example of FIG. 8). It becomes difficult to utilized phase difference to determine the arrival direction of sound when phase rotation occurs. Namely, an issue arises in that there are constraints on the inter-microphone distance when phase difference is utilized to correct for sensitivity difference between microphones and for noise suppression.

The phase difference utilization range setting section 30 accordingly computes a frequency band such that phase rotation in the phase difference between the input sound signal 1 and the input sound signal 2 does not arise, based on the inter-microphone distance d and the sampling frequency Fs. Then the computed frequency band is set as a phase difference utilization range for determining the arrival direction of sound by utilizing phase difference.

More specifically, the phase difference utilization range setting section 30 uses the inter-microphone distance d, the sampling frequency Fs and the speed of sound c to compute an upper limit frequency $f_{max}$ of the phase difference utilization range according to the following Equations (8) and (9).

$$f_{max}=Fs/2 \tag{8}$$

when d≤c/Fs $$f_{max}=c/(d*2) \tag{9}$$

when d>c/Fs

Figure 9:
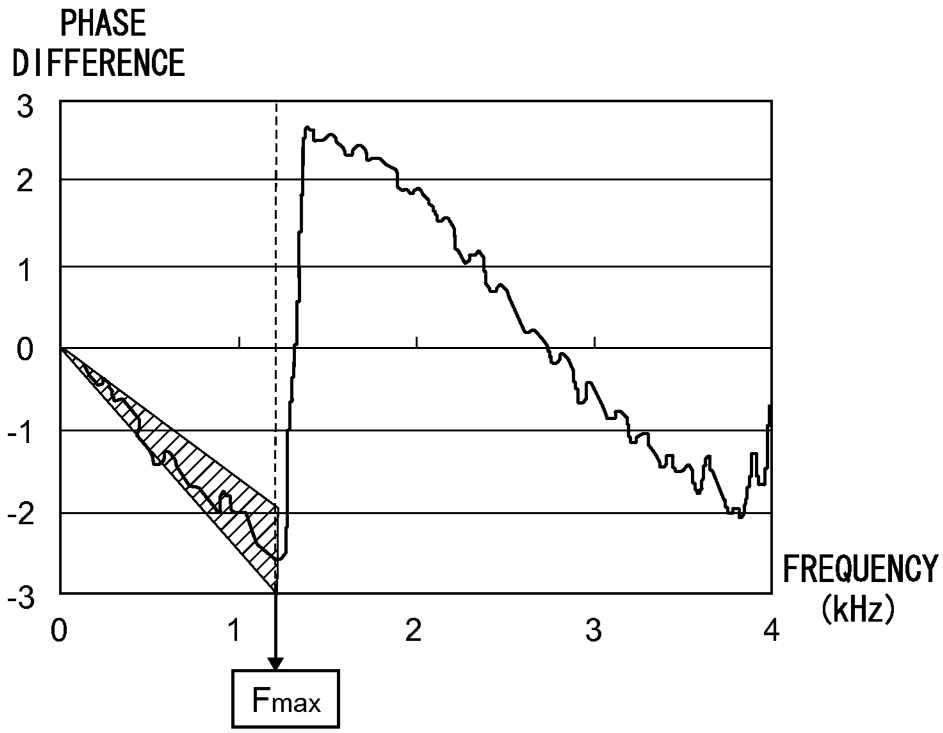
FIG. 9 is a schematic diagram to explain a phase difference determination region.

The phase difference utilization range setting section 30 sets as the phase difference utilization range a frequency band of computed $f_{max}$ or lower. Setting of the phase difference utilization range may be executed only once on operation startup of the device, and the computed upper limit frequency $f_{max}$ then stored for example in a memory. FIG. 9 illustrates phase differences when the sampling frequency Fs is 8 kHz, the inter-microphone distance d is 135 mm, and the sound source direction θ is 30°. In such cases, the $f_{max}$ is about 1.2 kHz by Equation (9).

The phase difference computation section 32 computes each phase spectrum of the signals $M_1(f, i)$ and the signals $M_2(f, i)$ in the phase difference utilization range (frequency band of frequency $f_{max}$ or lower) that has been set by the phase difference utilization range setting section 30. The phase difference computation section 32 then computes the phase difference between each of the phase spectra of the same frequency.

Then based on the phase difference computed by the phase difference computation section 32, the detection section 216 detects sound arrival directions other than the sound source direction of the target voice (referred to below as the "target sound direction") by determining the arrival direction of input sound signals for each of the frequencies f in each of the frames. Sounds arriving from outside of the target sound direction are treated as being sounds arriving from far away, enabling a value in the vicinity of 1.0 to be given to the amplitude ratio between input sound signals, similarly to the treatment of stationary noise.

More specifically, the detection section 216 determines from the phase difference computed by the phase difference computation section 32 whether or not sound of the current frame is sound that has arrived from the target sound direction. For example, when the noise suppression device 210 is installed in a mobile phone, the target sound direction is the direction of the mouth of the person who is holding the mobile phone and speaking. Explanation next follows regarding a case, as illustrated in FIG. 3, in which the target sound source is placed at a position nearer to the microphone 11A than to the microphone 11B.

The detection section 216, sets a determination region, for example as illustrated by diagonal lines in FIG. 9, to determine whether or not the input sound signal is sound that has arrived from the target sound direction when the computed phase difference is contained therein. When the phase difference of the determination region is contained in the phase difference utilization range that has been set in the phase difference utilization range setting section 30, the sound of the frequency f component of the current frame of the input sound signal may be treated as being sound that has arrived from the target sound direction. However, when the phase difference is outside of the determination region, the sound of the frequency f component of the current frame of the input sound signal may be treated as being sound that has arrived from outside the sound source direction.

The frame unit correction section 218 employs the signals $M_1(f, i)$ and the signals $M_2(f, i)$ detected as sound that has arrived from outside of the target sound direction by the detection section 216 to compute the sensitivity difference correction coefficient by frame unit, and corrects the signals $M_2(f, i)$ by frame unit. For example, similarly to the frame unit correction section 18 of the first exemplary embodiment, it is possible to compute a sensitivity difference correction coefficient $C_1(i)$ by frame unit as expressed by Equation (1). Note that in the second exemplary embodiment, the $f_{max}$ of Equation (1) is an upper limit frequency that has been set by the phase difference utilization range setting section 30. The term $\Sigma|M_1(f, i)|$ of Equation (1) takes a value that is the sum of the signals $M_1(f, i)$ detected by the detection section 216 as being sound arriving from outside the target sound direction over the range from frequency 0 to $f_{max}$. Similar applies to the term $\Sigma|M_2(f, i)|$. Moreover, the frame unit correction section 218, similarly to the frame unit correction section 18 of the first exemplary embodiment, generates signals $M_2'(f, i)$ that are the signals $M_2(f, i)$ corrected as expressed for example by Equation (2), based on the computed sensitivity difference correction coefficient $C_1(i)$ by frame unit.

The accuracy computation section 34 computes a degree of accuracy of the sensitivity difference correction. The second exemplary embodiment, utilizes the fact that the sound that has arrived from outside the target sound direction has a value of amplitude ratio between input sound signals that is close to 1.0, similarly to with stationary noise. However, in practice sometimes the amplitude ratio between detected input sound signals as sound that has arrived from outside of the target sound direction is a value that is not close to 1.0. Suppose that a value of the amplitude ratio is employed that deviates greatly from 1.0, then sometimes this does not enable accurate sensitivity difference correction to be performed, and audio distortion occurs when noise suppression is performed. Moreover, a similar issue arises when sufficient coefficient updating is not performed. In such cases configuration is made such that noise suppression is only performed when there is a high degree of accuracy to the sensitivity difference correction.

More specifically, out of each of the frequencies in the phase difference utilization range, the accuracy computation section 34 computes, as a probability that the input sound signal for that frame is sound from the target sound direction, a probability that a frequency with the phase difference is contained in the determination region (for example the region illustrated by diagonal lines in FIG. 9). Namely, the probability that a sound is from the target sound direction=the number of frequencies with phase difference contained in the determination region/the number of frequencies in the phase difference utilization range. The accuracy computation section 34 updates the degree of accuracy when there is a high probability that the sound is from the target sound direction. The probability that the sound is from the target sound direction is a value from 0.0 to 1.0, and hence a degree of accuracy $E_P(f, i)$ is computed such as that expressed by following Equation (10) when for example the probability that the sound comes from the target sound direction exceeds a threshold value, with a threshold value of for example 0.8.

$$E_P(f,i)=\gamma\times E_P(f,i-1)+(1-\gamma)\times(|M_1(f,i)|/|M_2''(f,i)| \tag{10}$$

Wherein γ here is an update coefficient representing the extent to reflect the degree of accuracy $E_P(f, i-1)$ computed for the previous frame in the degree of accuracy $E_P(f, i)$ computed for the current frame, and is a value such that $0\leq\gamma<1$. Note that γ is an example of a third update coefficient of technology disclosed herein. Namely, the degree of accuracy $E_P(f, i-1)$ for each of the frequencies of the previous frame is updated by computing the degree of accuracy $E_P(f, i)$ for each of the frequencies of the current frame.

The suppression coefficient computation section 224 computes the suppression coefficient $\epsilon(f, i)$ in a similar manner to the suppression coefficient computation section 24 of the first exemplary embodiment. However, for frequencies for which the degree of accuracy $E_P(f, i)$ is less than a specific threshold value (for example 1.0), this is treated as being a sensitivity difference correction coefficient that is not updated until accurate sensitivity difference correction may be performed, and the suppression coefficient $\epsilon(f, i)$ is taken as a 1.0 (a value for which no suppression is performed).

The noise suppression device 210 may, for example, be implemented by a computer 240 such as that illustrated in FIG. 4. The computer 240 includes a CPU 42, a memory 44 and a nonvolatile storage section 46. The CPU 42, the memory 44 and the storage section 46 are connected together through a bus 48. The microphone array 11 (the microphones 11A and 11B) are connected to the computer 240.

The storage section 46 may be implemented for example by a HDD or a flash memory. The storage section 46 serving as a storage medium is stored with a noise suppression program 250 for making the computer 240 function as the noise suppression device 210. The CPU 42 reads the noise suppression program 250 from the storage section 46, expands the noise suppression program 250 in the memory 44 and sequentially executes the processes of the noise suppression program 250.

The noise suppression program 250 includes an A/D conversion process 52, time-frequency conversion process 54, a detection process 256, a frame unit correction process 258, a frequency unit correction process 60, and an amplitude ratio computation process 62. The noise suppression program 250 also includes a suppression coefficient computation process 264, a suppression signal generation process 66, a frequency-time conversion process 68, a phase difference utilization range setting process 70, a phase difference computation process 72, and an accuracy computation process 74.

The CPU 42 operates as the detection section 216 illustrated in FIG. 6 by executing the detection process 256. The CPU 42 operates as the frame unit correction section 218 illustrated in FIG. 6 by executing the frame unit correction process 258. The CPU 42 operates as the suppression coefficient computation section 224 illustrated in FIG. 6 by executing the suppression coefficient computation process 264. The CPU 42 operates as the phase difference utilization range setting section 30 illustrated in FIG. 6 by executing the phase difference utilization range setting process 70. The CPU 42 operates as the phase difference computation section 32 illustrated in FIG. 6 by executing the phase difference computation process 72. The CPU 42 operates as the accuracy computation section 34 illustrated in FIG. 6 by executing the accuracy computation process 74. Other processes are similar to those of the noise suppression program 50 of the first exemplary embodiment. The computer 240 executing the noise suppression program 250 accordingly functions as the noise suppression device 210.

Note that it is possible to implement the noise suppression device 210 with, for example, a semiconductor integrated circuit, and more particularly with an ASIC and DSP.

Explanation next follows regarding operation of the noise suppression device 210 according to the second exemplary embodiment. When the input sound signal 1 and the input sound signal 2 are output from the microphone array 11, the CPU 42 expands the noise suppression program 250 stored on the storage section 46 into the memory 44, and executes the noise suppression processing illustrated in FIG. 10. Note that processing in the noise suppression processing of the second exemplary embodiment that is similar to the noise suppression processing in the first exemplary embodiment is allocated the same reference numerals and detailed explanation is omitted thereof.

Figure 10:
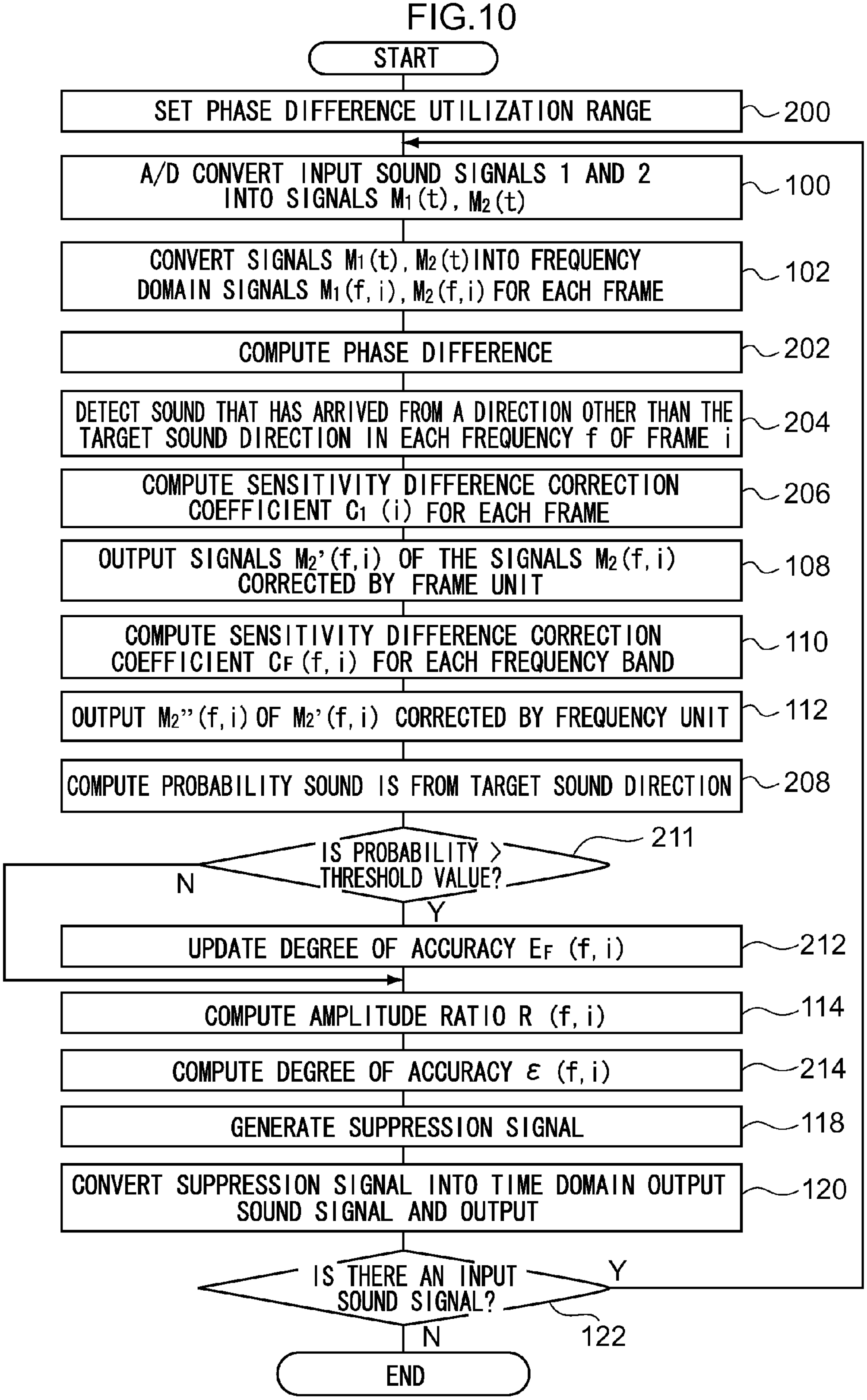
FIG. 10 is a flow chart illustrating noise suppression processing of a second exemplary embodiment.

At step 200 of the noise suppression processing illustrated in FIG. 10, the phase difference utilization range setting section 30 receives setting vales for the inter-microphone distance d and the sampling frequency Fs, and computes the frequency band capable of utilizing the phase difference to determining the arrival direction of sound, and sets the phase difference utilization range.

Then at steps 100 and 102, the input sound signal 1 and the input sound signal 2 that are analogue signals are converted into the signal $M_1(t)$ and the signal $M_2(t)$ that are digital signals, and then further converted into the signals $M_1(f, i)$ and the signals $M_2(f, i)$ that are frequency domain signals.

At the next step 202, the phase difference computation section 32 computes the respective phase spectra of the signals $M_1(f, i)$ and the signals $M_2(f, i)$ in the phase difference utilization range set by the phase difference utilization range setting section 30 (the frequency band of frequency $f_{max}$ or lower). The phase difference computation section 32 then computes as a phase difference the difference between respective phase spectra of the same frequency.

At the next step 204, the detection section 216 detects the signals $M_1(f, i)$ and the signals $M_2(f, i)$ expressing the arriving sound for directions other than the target sound direction by determining the arrival direction for each of the frequencies f of each of the frames based on the phase difference computed at step 202.

At the next step 206, the frame unit correction section 218 employs the signals $M_1(f, i)$ and the signals $M_2(f, i)$ detected as sound arriving from directions other than the target sound direction to compute the frame unit sensitivity difference correction coefficient $C_1(i)$ such as for example expressed by Equation (1). Note that the $f_{max}$ of Equation (1) is the upper limit frequency set by the phase difference utilization range setting section 30. The term $\Sigma|M_1(f, i)|$ of Equation (1) is the sum of signals $M_1(f, i)$ detected as sound arriving from directions other than the target sound direction over the range of frequencies from 0 to $f_{max}$. Similar applies to the term $\Sigma|M_2(f, i)|$.

The signals $M_2''(f, i)$ subjected to sensitivity difference correction by frequency unit are then generated from the signals $M_2(f, i)$ to which sensitivity difference correction by frame unit has been performed by steps 108 to 112.

At the next step 208, the accuracy computation section 34 computes as a probability that the input sound signal for that frame is sound from the target sound direction, a probability that a frequency with the phase difference is contained in the determination region (for example the region illustrated by diagonal lines in FIG. 9) out of each of the frequencies in the phase difference utilization range.

At the next step 211, the accuracy computation section 34 determines whether or not the probability computed at step 208 has exceeded a specific threshold value (for example 0.8). Processing proceeds to step 212 when the probability that that the sound is from the target sound direction exceeds the threshold value. At step 212, the accuracy computation section 34 updates the degree of accuracy $E_P(f, i-1)$ up to the previous frame by computation of the degree of accuracy $E_P(f, i)$ for example as expressed by Equation (10). However, when the probability that that the sound is from the target sound direction is determined at step 211 to be the threshold value or lower, the processing skips step 212 and proceeds to step 114.

At step 114, the amplitude ratio computation section 22 computes the amplitude ratios $R(f, i)$. At the next step 214, the suppression coefficient computation section 224 computes the suppression coefficient $\epsilon(f, i)$ similarly to at step 116 in the first exemplary embodiment. However, for frequencies where the degree of accuracy $E_P(f, i)$ updated at step 212 is less than a specific threshold value (for example 1.0), the suppression coefficient $\epsilon(f, i)$ is made 1.0 (a value for not performing suppression).

Subsequently, in steps 118 to 122 the output sound signal is output by processing similar to that of the first exemplary embodiment, and the noise suppression processing is ended.

As explained above, according to the noise suppression device 210 of the second exemplary embodiment, sound arriving from directions other than the target sound direction is detected based on the computed phase difference in the frequency band capable of utilizing phase difference. For sound arriving from directions other than the target sound direction, similarly to stationary noise, the amplitude ratio between the input sound signals are values close to 1.0, and the sensitivity difference between microphones is corrected. This thereby, similarly to with the first exemplary embodiment, enables the inter-microphone sensitivity difference to be rapidly corrected for, even for cases in which there are limitations to microphone array placement. A decrease is thereby enabled in audio distortion caused by noise suppression in which sensitivity difference correction is delayed. Moreover, noise suppression processing is performed only in cases in which there is a high degree of accuracy in the sensitivity difference correction, enabling audio distortion to be prevented from occurring due to noise suppression being performed when accurate sensitivity difference correction is unable to be performed.

Moreover, although explanation has been given in the second exemplary embodiment of cases in which the frame unit sensitivity difference correction coefficient $C_1(i)$, the frequency unit frequency sensitivity difference correction coefficient $C_P(f, i)$ and the degree of accuracy $E_P(f, i)$ are updated for each of the frames, there is no limitation thereto. The above noise suppression processing may be executed for a fixed period of time T1 (for example T1=1 hour), and then the finally updated values of $C_1(i)$, $C_P(f, i)$ and $E_P(f, i)$ saved for example in a memory. Then the saved values of $C_1(i)$, $C_P(f, i)$ and $E_P(f, i)$ may be subsequently employed. Moreover, configuration may be made such that the above noise suppression processing is executed every fixed period of time T2 (for example T2=1 hour), for a fixed period of time T3 (for example T3=10 minutes). Then the final updated values of $C_1(i)$, $C_P(f, i)$ and $E_P(f, i)$ may be employed in the interval until the next fixed period of time T2. Moreover, updating of the $C_1(i)$, the $C_P(f, i)$ and the $E_P(f, i)$ may be ended when $E_P(f, i)$ for all the frequencies f is already 1.0 or above.

Moreover, an update coefficient $\alpha$ in Equation (1), an update coefficient $\beta$ in Equation (3) and an update coefficient $\gamma$ in Equation (10) may be set so as to be larger the longer the execution duration of the above noise suppression processing. In order to rapidly complete update of each of the coefficients for each of the frequencies, according to the value of $E_P(f, i)$, for example when $E_P(f, i)<1.0$, the values of $\alpha$, $\beta$ and $\gamma$ may be updated as expressed by the following Equations (11) to (13). In such cases $\alpha$, $\beta$ and $\gamma$ adopt different values for each of the frequencies.

$$\alpha(f, i)=0.2\times E_P(f, i)+0.8 \tag{11}$$

$$\beta(f, i)=0.2\times E_P(f, i)+0.8 \tag{12}$$

$$\gamma(f, i)=0.2\times E_P(f, i)+0.8 \tag{13}$$

Note that the update coefficients $\alpha$, $\beta$ and $\gamma$ may all be updated using the same method, or may be updated using separate different methods.

In each of the above exemplary embodiments, explanation has been given regarding a noise suppression device that contains a microphone sensitivity difference correction device of technology disclosed herein, however a microphone sensitivity difference correction device of technology disclosed herein may be implemented as a stand-alone, or in combination with another device. For example, the configuration may be made such that a corrected signal is output as it is, or a corrected signal may be input to a device that performs other audio processing that noise suppression processing.

Figure 11:
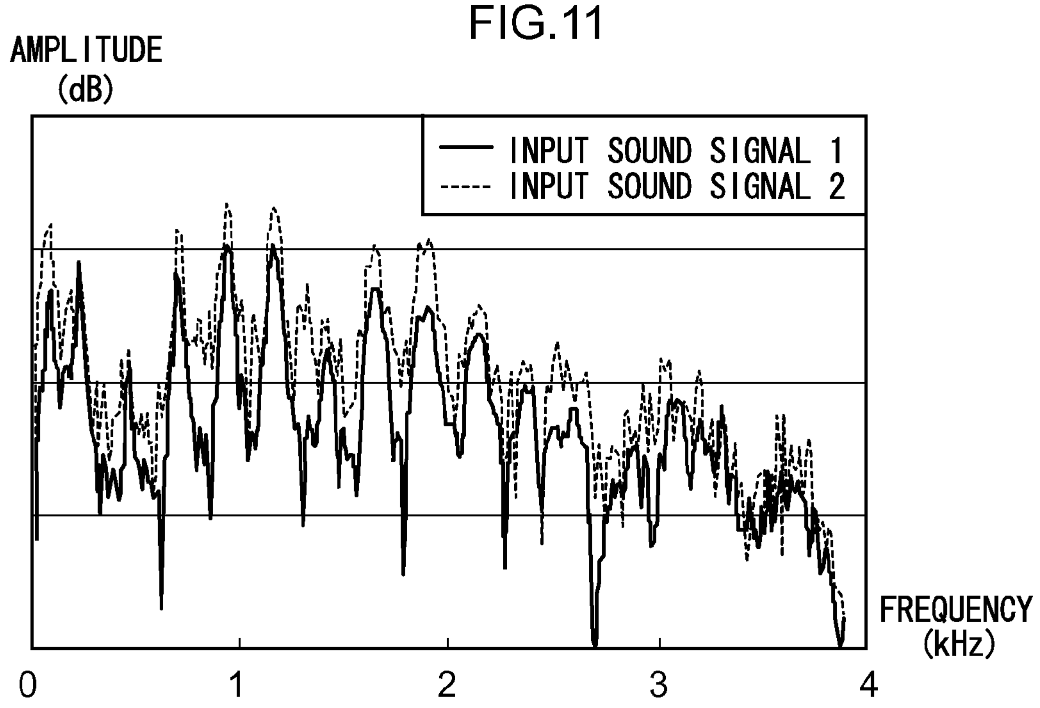
FIG. 11 is a graph illustrating an example of input sound signals.

Explanation has been given here of an example of noise suppression processing results of technology disclosed herein for a case in which each of the microphones are placed as illustrated in FIG. 1, the sampling frequency is 8 kHz, and the inter-microphone distance is 135 mm. FIG. 11 is a graph illustrating an example of amplitude spectra of the input sound signal 1 and the input sound signal 2. As long as there is no sensitivity difference between each of the microphones, the output of the input sound signal 1 output from the microphone 11A that is placed nearer to the sound source should have larger amplitude than the input sound signal 2. However, in the example of FIG. 11, the degree of suppression of the microphone 11B is greater than that of the microphone 11A, and so the amplitude of the input sound signal 2 is greater than the amplitude of the input sound signal 1.

Figure 12:
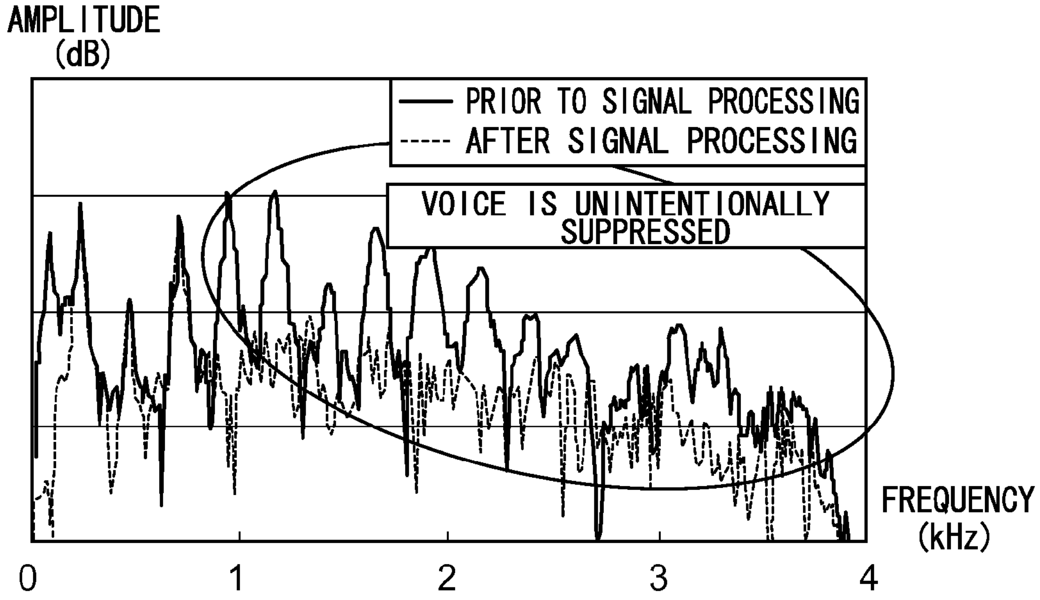
FIG. 12 is a graph illustrating an example results of noise suppression by a conventional method.

As a comparison example to the technology disclosed herein, results of performing noise suppression on the input sound signal 1 and the input sound signal 2 illustrated in FIG. 11 by employing a conventional method are illustrated in FIG. 12. The conventional method here is a method in which noise suppression processing is performed by sensitivity difference correction between each of the microphones based on sound arriving from orthogonal directions detected by employing phase difference. In this conventional method, it is only possible to perform accurate sensitivity difference correction in low frequency regions within the phase difference utilization range when the inter-microphone distance is larger than the speed of sound/sampling frequency. Thus, as illustrated in FIG. 12, a voice is suppressed in the intermediate to high frequency regions (the peak portions).

Figure 13:
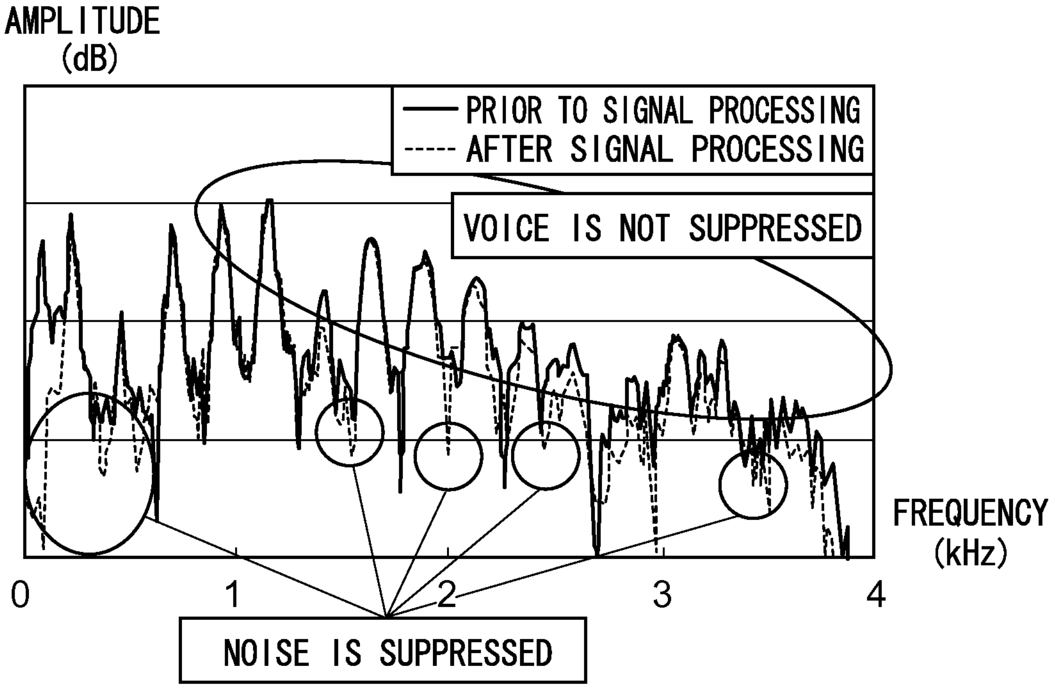
FIG. 13 is a graph illustrating an example results of noise suppression by technology disclosed herein.

However, results of performing noise suppression on the input sound signal 1 and the input sound signal 2 illustrated in FIG. 11 utilizing the technology disclosed herein are illustrated in FIG. 13. In the noise suppression results by the technology disclosed herein illustrated in FIG. 13, a voice is not suppressed across all the frequency bands, and only the noise (the valley portions) is suppressed.

Thus with the above method of technology disclosed herein, the degrees of freedom are raised for placing positions of each of the microphones, enabling installation to a microphone array of various devices that are getting thinner and thinner, such as smartphones. Moreover it is also possible to rapidly correct sensitivity differences between microphones, and to execute noise suppression without audio distortion.

Note that explanation has been given above of a mode in which the noise suppression programs 50 and 250 serving as examples of a noise suppression program of technology disclosed herein are pre-stored (pre-installed) on the storage section 46. However the noise suppression program of technology disclosed herein may be supplied in a format such as stored on a storage medium such as a CD-ROM or DVD-ROM.

An aspect of technology disclosed herein has the advantageous effect of enabling rapid correction to be performed for sensitivity differences between microphones even when there are limitations to the placement positions of the microphone arrays.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A microphone sensitivity difference correction device comprising:

a detection section that detects a frequency domain signal expressing a stationary noise, based on frequency domain signals of input sound signals respectively input from a plurality of microphones contained in a microphone array that have been converted into signals in a frequency domain for each frame of a plurality of frames;

a first correction section that employs the frequency domain signal expressing the stationary noise to compute a first correction coefficient for correcting the sensitivity difference between the plurality of microphones for each frame, and that employs the first correction coefficient to correct the frequency domain signals for each frame; and a second correction section that employs the frequency domain signals that have been corrected by the first correction section to compute a second correction coefficient for correcting for a plurality of frequency bands the sensitivity difference between the plurality of microphones, and that employs the second correction coefficient to correct for each frequency band the frequency domain signals that have been corrected by the first correction section.

2. The microphone sensitivity difference correction device of claim 1, further comprising:

a phase difference computation section that computes a phase difference for each frequency between frequency domain signals that correspond to each of the input sound signals, wherein the detection section, based on the phase difference for each of the frequencies, detects, as a frequency domain signal expressing the stationary noise, the frequency domain signals that correspond to the input sound signals that have arrived from a direction other than a sound source direction of a target voice.

3. The microphone sensitivity difference correction device of claim 2, further comprising:

a phase difference utilization range setting section that, based on an inter-microphone distance between the plurality of microphones and a sampling frequency, sets, as a phase difference utilization range, a frequency band in which phase rotation of phase difference for each of the frequencies does not occur, wherein:

the phase difference computation section computes a phase difference for each of the frequencies in the phase difference utilization range, and the detection section detects a frequency domain signal expressing the stationary noise in the phase difference utilization range.

4. The microphone sensitivity difference correction device of claim 3, further comprising an accuracy computation section that computes a probability that an input sound signal of the input sound signals has arrived from the sound source direction of the target voice based on a phase difference for each frequency of the phase difference utilization range, and that, when the probability is higher than a predetermined probability threshold value, computes a degree of accuracy of correction by the first correction section and the second correction section based on respective frequency domain signals that correspond to each of the input sound signals.

5. The microphone sensitivity difference correction device of claim 4, wherein, based on the degree of accuracy, the accuracy computation section updates at least one of:

a first update coefficient expressing a degree to reflect the first correction coefficient value computed a previous time when the first correction coefficient is being computed by the first correction section, a second update coefficient expressing a degree to reflect the second correction coefficient value computed the previous time when the second correction coefficient is being computed by the second correction section, or a third update coefficient expressing a degree to reflect the degree of accuracy value computed the previous time when the degree of accuracy is being computed by the accuracy computation section.

6. The microphone sensitivity difference correction device of claim 4, wherein when the degree of accuracy has exceeded a predetermined end threshold value, the accuracy computation section ends degree of accuracy computation, and ends computation of the first correction coefficient by the first correction section and ends computation of the second correction coefficient by the second correction section.

7. A noise suppression device comprising:

the microphone sensitivity difference correction device of claim 4; and a suppression section that, when a degree of accuracy computed by the accuracy computation section is greater than a predetermined suppression threshold value, suppresses noise contained in the input sound signals based on an amplitude ratio between the plurality of input sound signals derived using the frequency domain signals that have been corrected by the second correction section.

8. A noise suppression device comprising:

the microphone sensitivity difference correction device of claim 1; and a suppression section that suppresses noise contained in the input sound signals based on an amplitude ratio between the plurality of input sound signals derived using the frequency domain signals that have been corrected by the second correction section.

9. A microphone sensitivity difference correction method that causes a computer to execute processing, the processing comprising:

detecting a frequency domain signal expressing a stationary noise, based on frequency domain signals of input sound signals respectively input from a plurality of microphones contained in a microphone array that have been converted into signals in a frequency domain for each frame of a plurality of frames;

employing the frequency domain signal expressing the stationary noise to compute a first correction coefficient for correcting the sensitivity difference between the plurality of microphones for each frame, and employing the first correction coefficient to correct the frequency domain signals for each frame; and employing the frequency domain signals that have been corrected employing the first correction coefficient to compute a second correction coefficient for correcting for a plurality of frequency bands the sensitivity difference between the plurality of microphones, and employing the second correction coefficient to correct for each frequency band the frequency domain signals that have been corrected using the first correction coefficient.

10. The microphone sensitivity difference correction method of claim 9, wherein the processing further comprises:

computing a phase difference for each frequency between frequency domain signals that correspond to each of the input sound signals; and based on the phase difference for each of the frequencies, detecting, as a frequency domain signal expressing the stationary noise, the frequency domain signals that correspond to the input sound signals that have arrived from a direction other than a sound source direction of a target voice.

11. The microphone sensitivity difference correction method of claim 10, wherein the processing further comprises:

based on an inter-microphone distance between the plurality of microphones and a sampling frequency, setting, as a phase difference utilization range, a frequency band in which phase rotation of phase difference for each of the frequencies does not occur;

computing a phase difference for each of the frequencies in the phase difference utilization range; and detecting a frequency domain signal expressing the stationary noise in the phase difference utilization range.

12. The microphone sensitivity difference correction method of claim 11, wherein the processing further comprises:

computing a probability that an input sound signal of the input sound signals has arrived from the sound source direction of the target voice based on a phase difference for each frequency of the phase difference utilization range, and, when the probability is higher than a predetermined probability threshold value, computing a degree of accuracy of correction based on respective frequency domain signals that correspond to each of the input sound signals.

13. The microphone sensitivity difference correction method of claim 12, wherein the processing further comprises, based on the degree of accuracy, updating at least one of:

a first update coefficient expressing a degree to reflect the first correction coefficient value computed a previous time when the first correction coefficient is being computed, a second update coefficient expressing a degree to reflect the second correction coefficient value computed the previous time when the second correction coefficient is being computed, or a third update coefficient expressing a degree to reflect the degree of accuracy value computed the previous time when the degree of accuracy is being computed.

14. A noise suppression method that causes a computer to execute processing, the processing comprising:

the processing of the microphone sensitivity difference correction method of claim 12; and when a computed degree of accuracy is greater than a predetermined suppression threshold value, suppressing noise contained in the input sound signals based on an amplitude ratio between the plurality of input sound signals derived using the corrected frequency domain signals.

15. A storage medium storing a microphone sensitivity difference correction program that causes a computer to execute processing, the processing comprising:

detecting a frequency domain signal expressing a stationary noise based on frequency domain signals of input sound signals respectively input from a plurality of microphones contained in a microphone array that have been converted into signals in a frequency domain for each frame of a plurality of frames;

employing the frequency domain signal expressing the stationary noise to compute a first correction coefficient for correcting the sensitivity difference between the plurality of microphones for each frame, and employing the first correction coefficient to correct the frequency domain signals for each frame; and employing the frequency domain signals that have been corrected employing the first correction coefficient to compute a second correction coefficient for correcting for a plurality of frequency bands the sensitivity difference between the plurality of microphones, and employing the second correction coefficient to correct for each frequency band the frequency domain signals that have been corrected using the first correction coefficient.

16. The storage medium storing a microphone sensitivity difference correction program of claim 15, wherein the processing further comprises:

computing a phase difference for each frequency between frequency domain signals that correspond to each of the input sound signals; and based on the phase difference for each of the frequencies, detecting, as a frequency domain signal expressing the stationary noise, the frequency domain signals that correspond to the input sound signals that have arrived from a direction other than a sound source direction of a target voice.

17. The storage medium storing a microphone sensitivity difference correction program of claim 16, wherein the processing further comprises:

based on an inter-microphone distance between the plurality of microphones and a sampling frequency, setting, as a phase difference utilization range, a frequency band in which phase rotation of phase difference for each of the frequencies does not occur;

computing a phase difference for each of the frequencies in the phase difference utilization range; and detecting a frequency domain signal expressing the stationary noise in the phase difference utilization range.

18. The storage medium storing a microphone sensitivity difference correction program of claim 17, wherein the processing further comprises:

computing a probability that an input sound signal of the input sound signals has arrived from the sound source direction of the target voice based on a phase difference for each frequency of the phase difference utilization range, and, when the probability is higher than a predetermined probability threshold value, computing a degree of accuracy of correction based on respective frequency domain signals that correspond to each of the input sound signals.

19. The storage medium storing a microphone sensitivity difference correction program of claim 18, wherein the processing further comprises, based on the degree of accuracy, updating at least one of:

a first update coefficient expressing a degree to reflect the first correction coefficient value computed a previous time when the first correction coefficient is being computed, a second update coefficient expressing a degree to reflect the second correction coefficient value computed the previous time when the second correction coefficient is being computed, or a third update coefficient expressing a degree to reflect the degree of accuracy value computed the previous time when the degree of accuracy is being computed.

20. A storage medium storing a noise suppression program that causes a computer to execute processing, the processing comprising:

the processing of the microphone sensitivity difference correction program of claim 15; and when a computed degree of accuracy is greater than a predetermined suppression threshold value, suppressing noise contained in the input sound signals based on an amplitude ratio between the plurality of input sound signals derived using the corrected frequency domain signals.

* * * * *